US012202239B2

(12) United States Patent
Masuda

(10) Patent No.: US 12,202,239 B2
(45) Date of Patent: Jan. 21, 2025

(54) METHOD FOR FIXING SMOOTH MATERIALS USING IONIC LIQUID

(71) Applicant: Nisshinbo Holdings Inc., Tokyo (JP)

(72) Inventor: Gen Masuda, Chiba (JP)

(73) Assignee: NISSHINBO HOLDINGS INC., Tokyo (JP)

( * ) Notice: Subject to any disclaimer, the term of this patent is extended or adjusted under 35 U.S.C. 154(b) by 156 days.

(21) Appl. No.: 17/908,034

(22) PCT Filed: Feb. 2, 2021

(86) PCT No.: PCT/JP2021/003620
§ 371 (c)(1),
(2) Date: Aug. 30, 2022

(87) PCT Pub. No.: WO2021/176921
PCT Pub. Date: Sep. 10, 2021

(65) Prior Publication Data
US 2023/0090946 A1  Mar. 23, 2023

(30) Foreign Application Priority Data

Mar. 3, 2020 (JP) ................. 2020-035825

(51) Int. Cl.
| | | |
|---|---|---|
| *B32B 41/00* | (2006.01) | |
| *B32B 7/12* | (2006.01) | |
| *B32B 37/12* | (2006.01) | |
| *C08J 5/12* | (2006.01) | |
| *C09J 5/00* | (2006.01) | |
| *B32B 17/10* | (2006.01) | |

(52) U.S. Cl.
CPC ............... *B32B 37/12* (2013.01); *B32B 7/12* (2013.01); *C08J 5/122* (2013.01); *C09J 5/00* (2013.01);
(Continued)

(58) Field of Classification Search
CPC . B32B 37/12; B32B 7/12; B32B 17/10; C08J 5/122; C08J 2367/02; C09J 5/00;
(Continued)

(56) References Cited

U.S. PATENT DOCUMENTS

2006/0034035 A1* 2/2006 Maruo ................... H01G 11/22
361/502
2018/0059044 A1* 3/2018 Berduque ............ G01N 27/403
(Continued)

FOREIGN PATENT DOCUMENTS

| DE | 102009003011 A1 | 11/2009 |
|---|---|---|
| JP | 2002-3655 A | 1/2002 |

(Continued)

OTHER PUBLICATIONS

International Search Report dated Apr. 6, 2021, issued in counterpart International Application No. PCT/JP2021/003620 (2 pages).
(Continued)

*Primary Examiner* — Michael N Orlando
*Assistant Examiner* — Joshel Rivera
(74) *Attorney, Agent, or Firm* — WHDA, LLP

(57) ABSTRACT

A simple, highly versatile method for fixing smooth materials that utilizes a water pasting method can be provided by interposing an ionic liquid between smooth materials such as glass or resin not impregnated with an ionic liquid and fixing these smooth materials.

5 Claims, 1 Drawing Sheet

(52) U.S. Cl.
CPC ........... *B32B 17/10* (2013.01); *C08J 2367/02* (2013.01); *C09J 2400/146* (2013.01); *C09J 2467/008* (2013.01)

(58) Field of Classification Search
CPC ........... C09J 2400/146; C09J 2467/008; C03C 2217/231; C03C 17/23; C03C 27/10
USPC .................... 156/60, 64, 350, 351, 378, 379
See application file for complete search history.

(56) References Cited

U.S. PATENT DOCUMENTS

| | | |
|---|---|---|
| 2018/0265750 A1 | 9/2018 | Akamatsu et al. |
| 2019/0169469 A1 | 6/2019 | Wutti et al. |
| 2020/0299552 A1 | 9/2020 | Rachwal et al. |

FOREIGN PATENT DOCUMENTS

| | | |
|---|---|---|
| JP | 2005-28624 A | 2/2005 |
| JP | 2013-84950 A | 5/2013 |
| WO | 2016/170663 A1 | 10/2016 |
| WO | 2017/064925 A1 | 4/2017 |
| WO | 2019/104002 A2 | 5/2019 |

OTHER PUBLICATIONS

Office Action dated Aug. 9, 2023, issued in counterpart CN Application No. 202180018531.1. (8 pages).

Supplemental European Search Report dated Feb. 16, 2024, issued in counterpart International Application No. PCT/JP2021/003620 (8 pages).

* cited by examiner

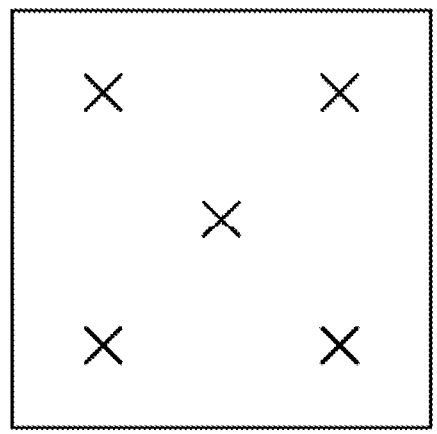

METHOD FOR FIXING SMOOTH MATERIALS USING IONIC LIQUID

TECHNICAL FIELD

The present invention relates to a method for fixing a smooth material using an ionic liquid, and more specifically, to a method for fixing a smooth material using an ionic liquid as a liquid of a water bonding method.

BACKGROUND ART

Conventionally, a smooth material such as a plastic heat insulating sheet is attached to a glass window to improve heating and cooling efficiency.

As such a heat insulating sheet, a sheet capable of so-called "water bonding" in which a glass surface is coated with water and a sheet is pressed thereto has been reported (see, for example, Patent Documents 1 and 2).

However, in these conventional methods, it is necessary to use a sheet having a special material or structure, for example, to improve a material of a resin constituting the sheet or to make the structure of the sheet itself special so as to enable water bonding, and thus versatility is lacking.

In addition, it is difficult to maintain a fixed state for a long period of time due to volatilization or the like as long as the sheet is immobilized with water, and there is also a problem that static electricity is generated at the time of peeling.

Furthermore, in the water bonding method, it is difficult to perform bonding at a high temperature equal to or higher than the boiling point of the liquid to be used or to maintain the bonded state at a high temperature, and it is also difficult to maintain the bonded state under high vacuum.

On the other hand, conventionally, when a base material such as a semiconductor wafer is processed (dicing, back grinding, photofabrication, or the like) or moved (the base material is moved from one apparatus to another apparatus), a method of temporarily fixing the base material and a support so that the base material does not shift and move from the support is used.

As this temporary fixing material, various pressure-sensitive adhesive agents and adhesive agents are used, but depending on the type of the pressure-sensitive adhesive agent, there are problems that a pressure-sensitive adhesive agent component remains on the release surface, static electricity is generated at the time of release to cause a problem, and shrinkage and elongation of a material due to a temperature change cannot be handled.

In addition, Patent Document 3 discloses a method using a release layer and an adhesive layer made of a predetermined composition for temporary fixing, and this method does not cause problems such as the temporary fixing material remaining on the release surface, but it is necessary to prepare a temporary fixing material in which the adhesive layer and the release layer are partially formed, and the preparation of the temporary fixing material itself is complicated, which cannot be said to be a simple method.

PRIOR ART DOCUMENTS

Patent Documents

Patent Document 1: JPA 2002-003655
Patent Document 2: JPA 2005-028624
Patent Document 3: JPA 2013-084950

SUMMARY OF INVENTION

Technical Problem

The present invention has been made in view of such circumstances, and an object of the present invention is to provide a simple and versatile method for fixing a smooth material using a water bonding method.

Solution to Problem

As a result of intensive studies to achieve the above object, the present inventor has found that by using an ionic liquid as a liquid for water bonding, various smooth materials not impregnated with the ionic liquid can be simply and easily fixed, and the immobilized smooth material can be easily peeled off thereby completing the present invention.

That is, the present invention provides:
1. A method for fixing a smooth material, including interposing an ionic liquid between smooth materials that are not impregnated with the ionic liquid, and immobilizing the smooth materials;
2. The method for fixing a smooth material according to 1, wherein an ionic liquid is applied or dropped on a surface of a first smooth material, and a second smooth material is attached and immobilized thereon;
3. The method for fixing a smooth material according to 1 or 2, wherein the smooth material is metal, glass, quartz glass, indium tin oxide, indium zinc oxide, indium gallium zinc oxide, resin, or a composite material thereof;
4. The method for fixing a smooth material according to any one of 1 to 3, wherein the ionic liquid is a quaternary ammonium salt type ionic liquid; and
5. The method for producing a laminate, including immobilizing a base material on a substrate via an ionic liquid and then applying a laminate material to a surface of the base material by spin coating method.

Advantageous Effects of Invention

According to the present invention, materials having smooth surfaces can be bonded and immobilized in an easily peelable state by a simple means called a water bonding method using an ionic liquid.

In addition, since the smooth materials are bonded and immobilized to each other with a nonvolatile ionic liquid interposed therebetween, the bonded state can be maintained even under vacuum or at a high temperature, and shrinkage and elongation of the materials due to temperature change can also be handled.

Further, since the ionic liquid is used for bonding and immobilization, peeling is also easy, static electricity is not generated at the time of peeling, and furthermore, the ionic liquid used for immobilization can be easily removed by wiping or the like after peeling.

BRIEF DESCRIPTION OF DRAWINGS

FIG. 1 is a diagram showing positions where an ionic liquid and tap water are dropped on a PET film in Example 2 and Comparative Example 1.

DESCRIPTION OF EMBODIMENTS

Hereinafter, the present invention is described in more detail.

A method for fixing a smooth material according to the present invention includes interposing an ionic liquid between smooth materials that are not impregnated with the ionic liquid, and immobilizing the smooth materials.

The smooth material is not particularly limited as long as it is not impregnated with the ionic liquid, but in the present invention, metal, glass, quartz glass, indium tin oxide (ITO), indium zinc oxide (IZO), indium gallium zinc oxide (IGZO), a resin, and a composite material thereof are particularly preferable.

Specific examples of the resin include polyolefins such as polyethylene and polypropylene, polyesters such as polyethylene terephthalate (PET), polyimide, polyvinyl chloride, polyvinylidene chloride, polyvinyl alcohol, polycarbonate, polystyrene, an ethylene-vinyl acetate copolymer, an ethylene-vinyl alcohol copolymer, triacetyl cellulose, and the like.

In addition, the shape of the smooth material is also not particularly limited, but in the present invention, plate-like, sheet-like, and film-like smooth materials can be particularly suitably used due to the nature of the fixing method.

The ionic liquid can be appropriately selected from conventionally known ionic liquids such as quaternary ammonium salt type, imidazolium salt type, pyridinium salt type, quaternary phosphonium salt type, choline type, and sulfonium salt type ionic liquids, and used. Since there are a wide variety of ionic liquid species, it is possible to select an appropriate ionic liquid according to the use situation. For example, it is possible to select an ionic liquid of a combination of a cation such as choline and an anion such as acetic acid, amino acid, or saccharinate which is considered to have little toxicity when there is a concern about an influence on an environment or a human body, such as attachment to a window glass or the like. When the ionic liquid is used at a high temperature, it is possible to select a combination of a cation of a phosphonium salt having good heat resistance and a fluorine-based anion such as bis(trifluoromethanesulfonyl)amide ion (TFSA). From a general standard, an ionic liquid which is liquid at normal temperature of about 25° C. is preferable, and in consideration of economic efficiency and environmental aspects, a quaternary ammonium salt type ionic liquid is more preferable, and an ionic liquid represented by the following formula (1) is still more preferable. Some of these ionic liquids can be obtained as commercially available products, and many of these ionic liquids can be simply synthesized by a known method.

[Chem. 1]

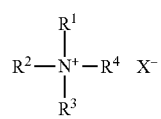

(1)

In the formula (1), $R^1$ to $R^4$ each independently represent an alkyl group having 1 to 4 carbon atoms, preferably 1 to 3 carbon atoms, or an alkoxyalkyl group represented by $-(CH_2)_n-OR$ (n represents an integer of 1 or 2.), R represents an alkyl group having 1 to 4 carbon atoms, preferably 1 to 3 carbon atoms, any one of $R^1$ to $R^4$ represents an alkoxyalkyl group, and $X^-$ represents a monovalent anion.

The alkyl group having 1 to 4 carbon atoms may be linear, branched, or cyclic, and examples thereof include methyl, ethyl, n-propyl, i-propyl, c-propyl, n-butyl, i-butyl, s-butyl, t-butyl, c-butyl groups, and the like, and in any of $R^1$ to $R^4$ and R, a methyl group and an ethyl group are preferable.

Also, any two of $R^1$ to $R^4$ may be bonded to each other to form a ring with a nitrogen atom.

Examples of such a ring structure include an aziridine ring, an azetidine ring, a pyrrolidine ring, a piperazine ring, an azepane ring, and the like, and a pyrrolidine ring and a piperazine ring are preferable, and a pyrrolidine ring is more preferable.

In the present invention, particularly suitable ionic liquids include those represented by the following formulae (2) and (3).

[Chem. 2]

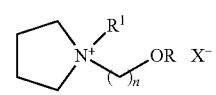

(2)

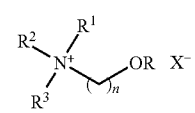

(3)

wherein $R^1$ to $R^4$, R, n and X have the same meanings as above.

Preferred examples of the cationic structure constituting the ionic liquid represented by the above formula (2) include, but are not limited to, those described below.

[Chem. 3]

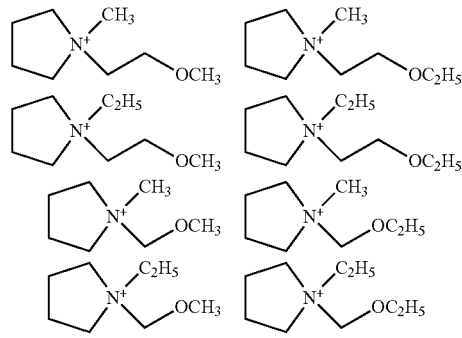

Among them, the following cationic structure (A) is preferable.

[Chem. 4]

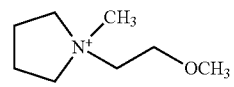

(A)

Preferred examples of the cationic structure constituting the ionic liquid represented by the above formula (3) include, but are not limited to, those described below.

[Chem. 5]

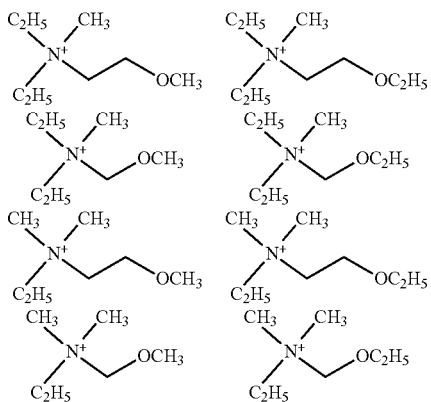

Among them, the following cationic structure (B) is preferable.

[Chem. 6]

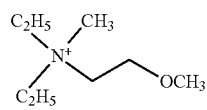

(B)

The monovalent anion of X⁻ can be appropriately selected from conventionally known monovalent anions constituting the ionic liquid.

Specific examples thereof include $BF_4^-$, $BF(CN)_3^-$, $PF_6^-$, bis(trifluoromethanesulfonyl)amide ion) (TFSA), bis(fluorosulfonyl)amide ion (FSA), trifluorometahanesulfonates, alkyl ester sulfate anions, alkyl ester phosphate anions, alkyl ester phosphite anions, amino acids, carboxylates, halogens, nitrate anion, saccharinate anion, and the like, but are not limited thereto.

In particular, as the ionic liquid used in the present invention, ionic liquids represented by the following formulas (2-1) and (3-1) are preferable because they have a high ability to form an ionic liquid with many anionic species, and in consideration of use at a high temperature or under high vacuum, an ionic liquid represented by the formula (2-1) is more preferable.

[Chem. 7]

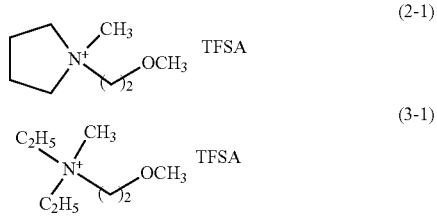

Specific examples of the method for fixing the smooth material of the present invention include a method in which an ionic liquid is applied or dropped on a surface of a first smooth material, and a second smooth material is attached and immobilized thereon. At this time, the first and second smooth materials may be either a fixing material or a fixed material, and the first smooth material and the second smooth material may be the same material or different materials.

In addition, the number of smooth materials is not limited to two, and may be three or more. In this case, the smooth materials may be fixed as a laminate of three or more layers, or two or more smooth materials may be separately fixed on one smooth material.

The area of application or dropping of the ionic liquid on the surface of the first smooth material is arbitrary as long as the first and second smooth materials can be immobilized, and the ionic liquid may be applied or dropped on the entire surface of the first smooth material, or may be applied or dropped only on a part thereof. In addition, the application method is also arbitrary, and may be appropriately selected from known methods.

For example, when a window glass is used as a base material and a PET film is immobilized to the window glass, an ionic liquid may be applied or dropped on the window glass and the PET film may be pressed against and bonded to the window glass to be fixed, or the ionic liquid applied or dropped on the surface of the PET film may be pressed against and bonded to the window glass to be fixed.

As described above, when this method is not used under heating or under vacuum at around room temperature, it is also possible to add an organic solvent compatible with the ionic liquid or a solvent such as water to lower the viscosity of the ionic liquid, and use the ionic liquid. In this case, a solution containing an ionic liquid may be sprayed onto the base material side of the window glass or the like to be fixed first with an atomizer or the like, and then a PET film to be fixed may be pressed and fixed. In this case, after the solvent is completely volatilized and only the ionic liquid is obtained, the film may be pressed and fixed, but even if some solvent component remains in the residual portion, it can be pressed and fixed.

In addition, for example, also in the case of fixing a base material such as an ITO substrate on a glass substrate via an ionic liquid, the ionic liquid may be applied or dropped on the glass substrate and the ITO substrate may be pressed against and bonded to the glass substrate to be fixed, or the ionic liquid applied or dropped on a bonding surface of the ITO substrate with the glass may be pressed against and bonded to the glass substrate to be fixed.

In this case, an ink for preparing a functional thin film (laminate material) such as an ink for preparing a hole transport layer is further applied onto the ITO substrate fixed to the glass substrate by spin coating method, and this is baked to obtain a laminate. The laminate including the two layers may be peeled off from the glass substrate in that state, or may be peeled off from the glass substrate after an element is prepared by laminating other functional layers such as a light emitting layer, an electron transport layer, and a cathode. In this case, since the light emitting layer and the like are immobilized with the ionic liquid, the light emitting layer and the like can be used even when they are prepared by vacuum vapor deposition.

As described above, the method for fixing a smooth material of the present invention can be suitably applied to the preparation of an electronic device such as an organic EL element or a semiconductor element.

As described above, the smooth material immobilized using the method for fixing a smooth material of the present invention has an advantage that a fixed state can be maintained for a long period of time since the ionic liquid does not have volatility. For example, when a heat insulating sheet, a light shielding sheet, or the like is attached to a window glass or the like to be fixed and used, the fixed state can be maintained until the sheet is replaced.

On the other hand, since the sheet is immobilized by water bonding method by liquid, the immobilized smooth material can be easily peeled off, and the release surface can also be easily cleaned by wiping or the like, and thus, it is also suitable for the temporary fixing at the time of preparing the electronic device described above.

EXAMPLES

Hereinafter, the present invention is described more specifically with reference to Examples and Comparative Examples, but the present invention is not limited to the following Examples.

[1] Fixation of Base Material During Spin Coating

Poly(3,4-ethylenedioxythiophene) (PEDOT/PSS solution, trade name CLEVIOS (registered trademark) P VP AI 4083, H. C. Starck GmbH) doped with poly(4-styrenesulfonic acid) was spin-coated on a PET film with ITO (manufactured by ATSUGI MICRO CO., LTD.) and baked using the following two methods.

Comparative Example 1

To a glass substrate (50 mm×5 mm, thickness 1 mm), a double-sided adhesive sheet NW-5302A (manufactured by Nitto Denko Corporation) cut into the same size was attached using an acrylic adhesive surface. The silicone-based adhesive surface of the double-sided adhesive sheet was exposed, and a PET film with ITO (50 mm×50 mm, thickness 0.25 mm) was attached and fixed so that the ITO surface was directed upward and closely overlapped with a glass substrate.

This member was placed on a dedicated jig attached to a spin coater (ACT-220AII, manufactured by ACTIVE Co., Ltd.) and fixed by a vacuum method. The PEDOT/PSS solution was dropped onto the member using a syringe until the entire surface was covered with the PEDOT/PSS solution. Thereafter, spin coating was performed under conditions of 1.000 rpm, 1 minute. After releasing the vacuum, this member was placed on a hot plate heated to a surface temperature of 120° C. and heated for 1 hour. After being removed from the hot plate and allowed to cool, the spin-coated PET film with ITO was tried to be peeled off, but the adhesive layer was solidified by heating and was not easily peeled off. When the film was forcibly peeled off, the film forming surface was stripped by the peeling operation as visually recognizable, and the uniformity was impaired.

Example 1

On a glass substrate (50 mm×50 mm, thickness 1 mm), one drop of an ionic liquid (N-(2-methoxyethyl)-N-methylpyrrolidinium bis(trifluoromethanesulfonyl)amide (MEMP·TFSA), manufactured by KANTO CHEMICAL CO., INC.) was dropped with a dropper, and then a PET film with ITO (50 mm×50 mm, thickness 0.25 mm) was placed with the ITO surface facing upward and the PET surface facing downward such that the ionic liquid spread over the whole, and was fixed so as to closely overlap with the glass substrate.

Spin coating and baking were performed in the same manner as in Comparative Example 1. After the cooling, when the PET film with ITO was peeled off from the glass substrate, the PET film was easily displaced by applying a small force to the end portion, and could be easily peeled off therefrom. Since the film was peeled off without applying stress, the film was obtained while maintaining the film forming surface uniformly.

[2] Attachment of Resin Film to Glass

Example 2 and Comparative Example 1

A commercially available PET film (Lumirror #100S10, thickness: 100 μm) was cut into a 50 mm×50 mm square, and five kinds of the following ionic liquids 1 to 5 and tap water as a comparison were dripped one drop at each of five points indicated by "x" in FIG. 1, and pressed and fixed to a window glass so as not to spill as much as possible. As a result, the film using tap water peeled off the next day, but the other films remained stuck for one month or more.

Ionic Liquids Used

Ionic liquid 1: Choline alanine (Choline-Ala)
Ionic liquid 2: N,N-Diethyl-N-(2-methoxyethyl)-N-methylammonium trifluoromethylsulfonate (DEME-$CF_3SO_3$)
Ionic liquid 3: Tributyldodecylphosphonium bis(fluorosulfonyl)amide (BDDP·FSA)
Ionic liquid 4: 1-Ethyl-3-methylimidazolium acetate (EMI·AcO)
Ionic liquid 5: N-(2-Methoxyethyl)-N-methylpyrrolidinium bis(trifluoromethanesulfonyl)amide (MEMP·TFSA)

The invention claimed is:
1. A method for fixing materials having such smooth surfaces that the smooth surfaces can be fixed to each other by a water bonding method, comprising interposing an ionic liquid between the materials that are not impregnated with the ionic liquid, and immobilizing the materials in an easily peelable state by the water bonding method,
wherein said ionic liquid is selected from the group consisting of a quaternary ammonium salt type ionic liquid represented by the general formula (1), imidazolium salt type ionic liquid, pyridinium salt type ionic liquid, quaternary phosphonium salt type ionic liquid, choline type ionic liquid, and sulfonium salt type ionic liquid,

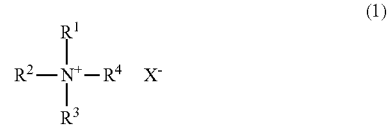

(1)

wherein $R^1$ to $R^4$ each independently represent an alkyl group having 1 to 4 carbon atoms or an alkoxyalkyl group represented by $-(CH_2)_n-OR$, n represents an integer of 1 or 2, R represents an alkyl group having 1 to 4 carbon atoms, any one of $R^1$ to $R^4$ represents an alkoxyalkyl group, and $X^-$ represents a monovalent anion.
2. The method according to claim 1, wherein the ionic liquid is applied or dropped on the surface of a first material having a smooth surface, and a second material having a smooth surface is attached and immobilized thereon.

3. The method according to claim 1, wherein the materials having the smooth surfaces are metal, glass, quartz glass, indium tin oxide, indium zinc oxide, indium gallium zinc oxide, resin, or a composite material thereof.

4. The method according to claim 1, wherein the ionic liquid is a quaternary ammonium salt type ionic liquid represented by the general formula (2) or (3),

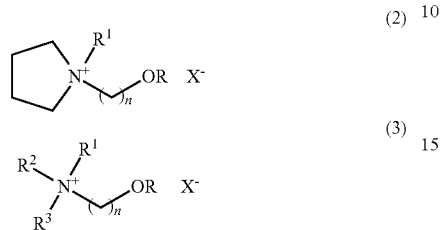

(2)

(3)

wherein $R^1$ to $R^3$, R, n and X have the same as defined in claim 1.

5. A method for producing a laminate, comprising immobilizing a base material that is not impregnated with the ionic liquid on a substrate that is not impregnated with the ionic liquid in an easily peelable state by a water bonding method using an ionic liquid and then applying a laminate material to a surface of the base material by spin coating method, wherein said ionic liquid is selected from the group consisting of a quaternary ammonium salt type ionic liquid represented by the general formula (1), imidazolium salt type ionic liquid, pyridinium salt type ionic liquid, quaternary phosphonium salt type ionic liquid, choline type ionic liquid, and sulfonium salt type ionic liquid,

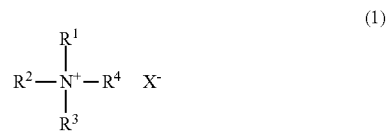

(1)

wherein $R^1$ to $R^4$ each independently represent an alkyl group having 1 to 4 carbon atoms or an alkoxyalkyl group represented by —$(CH_2)_n$—OR, n represents an integer of 1 or 2, R represents an alkyl group having 1 to 4 carbon atoms, any one of $R^1$ to $R^4$ represents an alkoxyalkyl group, and $X^-$ represents a monovalent anion.

* * * * *